Nov. 3, 1959　　　B. W. LERCH　　　2,911,318
SHOCK-RESISTANT, ADHESIVE TAPES
Filed April 4, 1956

INVENTOR.
B. W. LERCH
BY
ATTORNEY $$2,911,318$$

Patented Nov. 3, 1959

2,911,318

SHOCK-RESISTANT, ADHESIVE TAPES

Brooke W. Lerch, Stoneleigh, Md., assignor to Western Electric Company, Incorporated, New York, N.Y., a corporation of New York Application April 4, 1956, Serial No. 576,031

4 Claims. (Cl. 117—33)

This invention relates to tapes, and more particularly to pressure-sensitive adhesive tapes that are flexible and that have a high resistance to shock or impact.

In bundling or packaging articles it is often desirable to have a tape which is flexible so that it can be subjected to repeated torsional stresses. It is also often desirable that the tape be capable of withstanding extreme shock or impact. These two advantages, flexibility and high impact resistance, are particularly desirable in electrical cables used in the communications industry, and in tapes used to cover splices between such cables. Tapes having plastic backing strips, such as the well-known pressure-sensitive mending tapes, satisfy the flexing requirements generally, but they have poor impact resistance. The same is true of tapes having backing strips of fibrous materials, such as woven textile materials.

Tapes having rubber backing strips can withstand impact, but they are not sufficiently flexible to withstand repeated torsional stresses. In the past, tapes have been suggested in which a strip of fibrous or plastic material adheres to a strip of rubber. Such a tape is disadvantageous with respect to the flexure requirements mentioned hereinabove for the same reason that a plain rubber tape is disadvantageous, that is, tapes of this type cannot withstand repeated torsion.

It is an object of this invention to provide new and improved tapes.

A further object of the invention is to provide new and improved pressure-sensitive adhesive tapes that are flexible and have a high resistance to shock or impact.

A shock-resistant tape illustrating certain features of the invention may include a strip of material, a plurality of particles of a resilient material and a pressure-sensitive adhesive material securing the particles to the strip.

A complete understanding of the invention may be obtained from the following detailed description of tapes and methods of making them, forming specific embodiments thereof, when read in conjunction with the appended drawings, in which.

First embodiment

Figure 1:
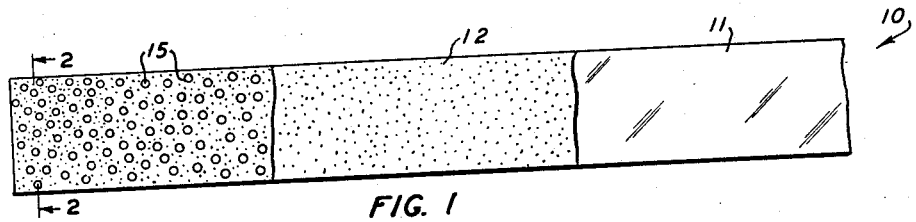
Fig. 1 is a fragmentary, plan view, with portions thereof broken away, of a tape comprising one embodiment of the invention.

Referring now to Fig. 1, a tape 10 is illustrated having a backing strip 11. In this embodiment of the invention, the backing strip 11 may be made of any suitable material well known in the tape making art, such as cellulose acetate or cellophane. One surface of the strip 11 is covered with a coating 12 of the pressure-sensitive adhesive material. If the plastic strip 11 is active with respect to the pressure-sensitive adhesive coating 12, the opposite surface of the strip 11 may be covered with a sizing coating (not shown) of a resinous varnish which is inactive with respect to the pressure-sensitive adhesive coating 12. The sizing coating permits the tape 10, which is normally wound into rolls to be unwound readily. Examples of materials that may be used to form such a sizing coating are shellac and glue. Other suitable film-forming materials which are inactive with respect to the pressure-sensitive adhesive coating 12 may be used to form the sizing coating.

The pressure-sensitive adhesive coating 12 may be prepared by applying to the backing strip 11 a known type of adhesive solution or dispersion, which adheres tenaciously to the strip 11. Examples of suitable adhesives that may be used to form the coating 12 are compounds including a polymerized isobutylene elastomer and a hydrogenated resin of a class comprising hydrogenated indene resins, coumarone resins, dicyclopentadiene resins and combinations thereof combined in proportions adapted to form a normally-tacky, pressure-sensitive adhesive coating. Such a compound is dispersed in a sufficient quantity of a volatile vehicle to make a thick mass which may be spread upon the backing strip 11. Examples of adhesive solutions and dispersions suitable for forming the coating 12 are disclosed in Tierney Patent 2,319,959, Drew Patent 2,328,066, Drew Patent 1,814,132, and Drew Patent 1,954,805.

Upon evaporation of the volatile vehicle, by heating for example, there is left a normally-tacky, pressure-sensitive adhesive coating. Such a pressure-sensitive adhesive is normally-tacky, non-drying and is stable in a condition such that it need not be activated by solvents or heat or otherwise processed in order to secure tenacious adherence to susceptible surfaces against which the adhesive may be pressed.

Figure 2:
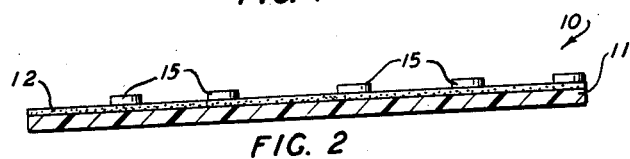
Fig. 2 is an enlarged, transverse section taken along line 2—2 of Fig. 1.

To increase the shock resistance of the tape 10 without subjecting the tape to the disadvantage of not being able to withstand repeated torsion, a plurality of particles 15—15 of a resilient, cushioning material are dispersed on and held securely by the exposed surface of the pressure-sensitive adhesive coating 12. The particles 15—15 may be made of cured rubber, or other rubber-like or shock-resistant material, such as synthetic rubber or neoprene. The particles 15—15 may be in the form of small discs, as shown in Figs. 1 and 2. They can, of course, be of any suitable shape. It is convenient to make the discs 15—15 by cutting small pieces of any desirable thickness from a strand of cured rubber having a circular cross section.

The spacing of the discs 15—15 is not critical and any number of discs can be provided depending upon the amount of shock or impact resistance that is desired. The only obvious requirement is that suitable spaces exist between the discs 15—15 to permit the pressure-sensitive adhesive coating 12 to adhere to any susceptible surface with which it may come into contact.

As described hereinabove, the tape 10 is provided with a backing strip 11 of a plastic material to provide a tape that is flexible, while the resilient particles 15—15 increase the resistance of the tape to shock or impact. In lieu of making the backing strip 11 of plastic material, this strip may be made of a fibrous material, such as woven textile strands, of which cotton, linen and rayon strands are examples, or woven glass strands. When the backing strip is made of such textile or glass strands, it may be necessary to apply to the surface opposite to that to which the pressure-sensitive adhesive coating is applied, a sizing coating, such as shellac or glue, that is inactive with respect to the pressure-sensitive adhesive coating. As described hereinabove, such a sizing coating permits a tape, which is normally wound into rolls, to be unwound readily.

The tape 10, while being capable of many uses, is particularly useful as a covering for splices that are made between electrical cables. The tape 10 will impart to such splices the high degree of flexibility that is obviously required, and will greatly increase the resistance of the splice to shock or impact.

*Second embodiment*

Figure 3:
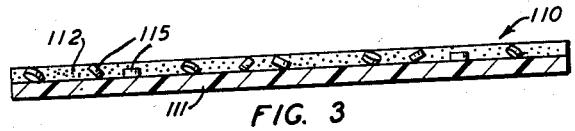
Fig. 3 is a section similar to that shown in Fig. 2, illustrating a tape comprising a second embodiment of the invention.

In a second embodiment of the invention shown in Fig. 3, a tape 110 is provided with a backing strip 111 of a suitable plastic material, such as cellulose acetate or cellophane. A coating 112 of a normally-tacky, pressure-sensitive adhesive material adheres tenaciously to the backing strip 111. Dispersed within the coating 112 is a plurality of particles 115—115 of a resilient, cushioning material, such as cured rubber, synthetic rubber or neoprene. Instead of merely scattering the discs 115—115 on the surface of the pressure-sensitive adhesive material 112, as is done in the first embodiment of the invention, the discs are incorporated in the pressure-sensitive adhesive material. The discs 115—115 preferably are added to a mass of pressure-sensitive material after the volatile vehicle has been added thereto to make the thick mass which may be spread upon the backing strip 111, described hereinabove.

The pressure of the pressure-sensitive adhesive material with the volatile vehicle and discs 115—115 incorporated therein is then spread upon the backing strip 111, and the volatile vehicle is evaporated. The tape 110 formed thereby has not only flexibility and high resistance to impact, but the entire pressure-sensitive adhesive coating 112 will adhere to a susceptible surface since none of the rubber discs will be interposed between such a surface and the pressure-sensitive adhesive coating.

*Third embodiment*

Figure 4:
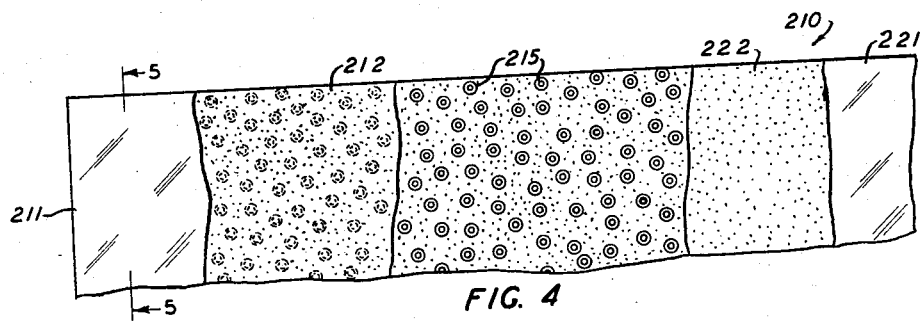
Fig. 4 is a fragmentary, plan view, with portions thereof broken away, illustrating a tape comprising a third embodiment of the invention.
Figure 5:
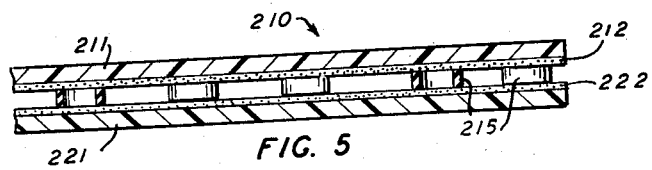
Fig. 5 is an enlarged, fragmentary, transverse section taken along line 5—5 of Fig. 4.

Figs. 4 and 5 show a third embodiment of the invention. Therein, a tape 210 includes two backing sheets 211 and 221 which are shown in Fig. 5 to be made of a plastic material, but which may be made also of a fibrous material, since both are suitably flexible. The sheets 211 and 221 have, respectively, coatings 212 and 222 of a normally-tacky, pressure-sensitive adhesive material coated thereon and secured tenaciously thereto. After formation of the pressure-sensitive, adhesive-coated sheets 211 and 221, particles 215—215 of a resilient, cushioning material, such as cured rubber, synthetic rubber or neoprene, are interposed between the two adhesive coatings 212 and 222. The rubber particles 215—215 may be positioned first on one of the adhesive-coated sheets and then the second sheet brought into contact with the first as shown in Figs. 4 and 5. In this manner, the particles 215—215 are secured fixedly in their positions between the backing sheets 211 and 221.

The particles 215—215 may be of any desired shape. One suitable shape is that shown in Figs. 4 and 5, wherein the particles are in the form of rings. The particles 215—215 should be so positioned that sufficient portions of the pressure-sensitive adhesive coatings 212 and 222 contact each other to secure the particles 215—215 firmly in place and to hold the sheets 211 and 221 tightly together. Although, in Fig. 5, the sheets 211 and 221 and the coatings 212 and 222 are shown diagrammatically as being mutually parallel, the coatings 212 and 222 will in fact be united in the spaces between the rings 215—215.

The tape or composite adhesive sheet 210 forms a very desirable packing material and one that can be conveniently secured, by nailing or stapling for example, to form linings of boxes, or other containers, in which articles are to be protected. When a container is lined with the tape 210, increased protection is given to any articles placed therein because of the increased shock or impact resistance afforded by the tape. Further, the tape 210 is suitable for wrapping delicate objects, such as watches and the like.

*Fourth embodiment*

Figure 6:
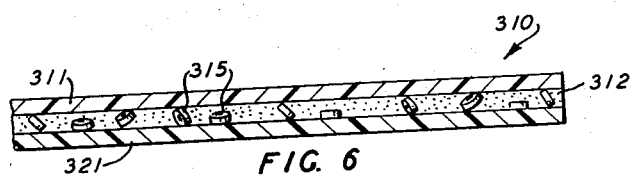
Fig. 6 is a section similar to that shown in Fig. 5, illustrating a tape comprising a fourth embodiment of the invention.

Fig. 6 shows a fourth embodiment of the invention. In this embodiment, a tape 310 is provided which is somewhat similar to the tape 210 shown in Figs. 4 and 5. The tape 310 includes two backing sheets 311 and 321, which are shown in Fig. 6 to be made of a plastic material, but which may be made also of a woven fibrous material. The sheets 311 and 321 have particles of a cushioning or resilient material, such as ring-shaped cured rubber or rubber-like particles 315—315, secured fixedly therebetween. Besides being made of cured rubber, the particles may be made of synthetic rubber or neoprene.

The particles 315—315 may be incorporated in a normally-tacky, pressure-sensitive adhesive material after the volatile vehicle has been added thereto to form the thick mass, as described hereinabove. The pressure-sensitive adhesive material with the volatile vehicle and the ring-shaped particles 315—315 incorporated therein may then be applied to the sheets 321 to form the coating 312, the other sheet 321 placed over the pressure-sensitive adhesive coating 312 and the volatile vehicle evaporated, by heating for example. The coating 312 having the particles 315—315 incorporated therein so interposed between the two sheets 311 and 321 will result in a highly flexible and impact resistant tape 310 that is useful as a packing material.

*Fifth embodiment*

Figure 7:
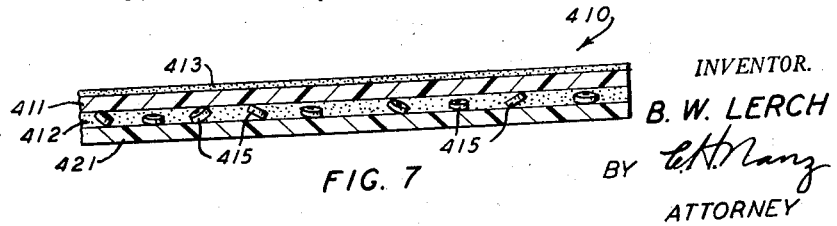
Fig. 7 is a section similar to those shown in Figs. 5 and 6, illustrating a tape comprising a fifth embodiment of the invention.

A fifth embodiment of the invention is shown in Fig. 7. In this embodiment, a tape 410 is provided which is similar to the tape 310 shown in Fig. 6, except that an additional coating of a pressure-sensitive adhesive material is applied to one of the backing sheets. The tape 410 includes two backing sheets 411 and 421, which are shown in Fig. 7 to be made of a plastic material, but which may be made also of a woven fibrous material. Like the tape 310 shown in Fig. 6, the sheets 411 and 421 have particles of a cushioning or resilient material, such as ring-shaped cured rubber or rubber-like particles 415—415, secured fixedly therebetween. Examples of such rubber-like materials are synthetic rubber and neoprene.

The particles 415—415 may be incorporated within a normally-tacky, pressure-sensitive adhesive material during the formation thereof and the adhesive material with the particles incorporated therein applied to the backing sheet 421 prior to the evaporation of the volatile vehicle therein. A coating 412 of pressure-sensitive adhesive with the resilient particles 415—415 incorporated therein is formed thereby. The tape 410 is then completed by placing the second sheet 411 over the pressure-sensitive adhesive coating 412, applying a second coating 413 of the pressure-sensitive adhesive to the exposed surface of the sheet 411, and evaporating the volatile vehicle within the pressure-sensitive adhesive coatings 412 and 413 by a suitable step, such as by heating.

The tape 410 is useful as a packing material and because of the coating 413 of pressure-sensitive adhesive material need not be nailed or stapled within a container to form a lining thereof. Because of the pressure-sensitive adhesive coating 413, the tape 410 need only be applied to the interior of the package and the coating 413 will hold the tape 410 securely in place.

While this invention has been illustrated by the particular tapes shown in Figs. 1 to 7, inclusive, it is obvious that the salient features of the invention may be employed to form numerous other types of tapes wherein both flexibility and high shock or impact resistance are desired. It is to be understood that the present invention is not limited to the embodiments described herein, but may be embodied in various modifications within the spirit and scope of the invention.

What is claimed is:

1. A shock-resistant adhesive tape, which comprises a strip of flexible material, a continuous film of normally-tacky, pressure-sensitive, adhesive material coating the strip of flexible material and adhering tenaciously thereto, and a plurality of particles of resilient material embedded in the adhesive material in spaced relationship, said resilient material being selected from the group consisting of cured rubber and cured synthetic rubber.

2. A shock-resistant adhesive tape, which comprises a strip of flexible, plastic material, a continuous film of normally-tacky, pressure-sensitive, adhesive material coating the strip of plastic material and adhering tenaciously thereto, and a plurality of particles of resilient material embedded in the adhesive material in spaced relationship, said resilient material being selected from the group consisting of cured rubber and cured synthetic rubber.

3. A shock-resistant adhesive tape, which comprises a strip of flexible material, a continuous film of normally-tacky, pressure-sensitive, adhesive material coating the strip of flexible material and adhering tenaciously thereto, and a plurality of particles of resilient material secured to the coating of adhesive material and held firmly in spaced relationship thereby, said resilient material being selected from the group consisting of cured rubber and cured synthetic rubber.

4. A shock-resistant adhesive tape, which comprises a strip of flexible material, a continuous film of normally-tacky, pressure-sensitive, adhesive material coating the strip of flexible material and adhering tenaciously thereto, and a plurality of small discs of resilient material secured to the adhesive material and held firmly in spaced relationship thereby, said resilient material being selected from the group consisting of cured rubber and cured synthetic rubber.

References Cited in the file of this patent

UNITED STATES PATENTS

| | | |
|---|---|---|
| 196,531 | Long | Oct. 30, 1877 |
| 1,820,050 | Crowell | Aug. 25, 1931 |
| 1,895,711 | Foley | Jan. 31, 1933 |
| 1,968,809 | Curtis | Aug. 7, 1934 |
| 2,341,713 | Griswold | Feb. 15, 1944 |
| 2,362,786 | Williams | Nov. 14, 1944 |
| 2,494,848 | Whitelegg | Jan. 17, 1950 |
| 2,494,297 | Hempel | Jan. 10, 1950 |
| 2,568,126 | Keeley | Sept. 18, 1951 |
| 2,674,555 | Pahl et al. | Apr. 6, 1954 |
| 2,682,515 | Naps | June 29, 1954 |
| 2,704,725 | Berglund | Mar. 22, 1955 |
| 2,706,936 | Willson | Apr. 26, 1955 |
| 2,768,902 | Scholl | Oct. 30, 1956 |
| 2,798,006 | Oldfield | July 2, 1957 |
| 2,793,136 | Root | May 21, 1957 |